| United States Patent [19] | [11] Patent Number: 4,829,849 |
|---|---|
| Masuda et al. | [45] Date of Patent: May 16, 1989 |

[54] POWER TRANSMISSION SYSTEM FOR VEHICLES

[75] Inventors: Katsuhiko Masuda; Tetsuro Hamada; Kazunori Shibuya; Kazuhiko Shimada, all of Tochigi, Japan

[73] Assignee: Honda Giken Kogyo Kabushiki Kaisha, Tokyo, Japan

[21] Appl. No.: 87,482

[22] Filed: Aug. 20, 1987

[30] Foreign Application Priority Data

Aug. 20, 1986 [JP] Japan ................. 61-192792

[51] Int. Cl.$^4$ .................. F16H 35/04; F16H 1/44
[52] U.S. Cl. ........................ 74/650; 74/711; 180/247
[58] Field of Search ................. 74/710–715, 74/711, 650; 180/233, 247, 248, 249, 250; 192/48.3, 48.8, 49, 56 R, 57, 58 B

[56] References Cited

U.S. PATENT DOCUMENTS

| 3,396,605 | 8/1968 | Wilkinson et al. | 74/650 |
|---|---|---|---|
| 4,058,027 | 11/1977 | Webb | 74/711 |
| 4,096,712 | 1/1978 | Webb | 74/711 |
| 4,562,897 | 1/1986 | Renneker | 180/247 X |
| 4,605,087 | 8/1986 | Ashauer et al. | 180/233 X |
| 4,650,028 | 3/1987 | Eastman et al. | 74/650 X |
| 4,683,998 | 8/1987 | Cigdem et al. | 74/711 X |
| 4,718,300 | 1/1988 | Magg | 74/711 X |
| 4,721,010 | 1/1988 | Sheldon et al. | 74/650 |

FOREIGN PATENT DOCUMENTS

| 3536682 | 4/1986 | Fed. Rep. of Germany. |
|---|---|---|
| 58-50349 | 3/1983 | Japan. |
| 782338 | 9/1957 | United Kingdom. |
| 133878 | 10/1973 | United Kingdom. |
| 1498061 | 1/1978 | United Kingdom. |
| 1551009 | 8/1979 | United Kingdom. |
| 2161872 | 1/1986 | United Kingdom. |
| 2162910 | 2/1986 | United Kingdom. |
| 2182402 | 5/1987 | United Kingdom. |
| WO86/02133 | 4/1986 | World Int. Prop. O. . |

*Primary Examiner*—Dirk Wright
*Attorney, Agent, or Firm*—Lyon & Lyon

[57] ABSTRACT

A power transmission system suitable for use in a four-wheel drive motorcar. A torque generated from a power source is directly transmitted to a first axle, and it is transmitted to a second axle via a torque transmission device making use of viscosity of fluid. Between the power source and the second axle is provided torque limiter means for limiting a torque transmitted to the second axle to smaller than a preset value. Even if the torque transmission device should take a locked condition, an excessively large torque would not be exerted upon the respective parts in the power transmission system, and hence a torque transmission system can be made light in weight.

4 Claims, 3 Drawing Sheets

POWER TRANSMISSION SYSTEM FOR VEHICLES

BACKGROUND OF THE INVENTION

The present invention relates to a power transmission system for vehicles, and more particularly to a power transmission system suitable for use in a four-wheel drive motorcar in which front wheels and rear wheels are both driven.

In motorcars, normally, power of an engine is transmitted to left and right drive wheels via a differential gear unit, and this differential gear unit is complexed in structure and heavy in weight. Moreover, since if either one of left and right drive wheels becomes a no-load condition it occurs that a torque cannot be transmitted to either drive wheel, in order to avoid such condition a differential operation limiter must be provided, and consequently, the differential gear unit becomes further complexed and has its weight increased.

As a replacement for such a differential gear unit, differential drive means making use of a viscous fluid coupling mechanism has been proposed, for instance, in Laid-Open Japanese Patent Publication No. 58-50349 (1983). In this differential drive means, viscous fluid such as silicone fluid or the like is enclosed within a housing which is connected to a drive shaft on an engine side and adapted to be rotated jointly with that drive shaft, and left and right axles are fitted into the same housing. In addition, within the same housing are assembled a large number of annular plates which are mounted respectively to that housing and the left and right axles opposed to each other, so that rotation of the housing can be transmitted to the left and right axles by the intermediary of a viscous shearing force of the viscous fluid. Furthermore, owing to fluid slip of that viscous fluid, the left and right axles can operate differentially with respect to each other and with respect to the housing.

In the above-referred Laid-Open Japanese Patent Publication No. 58-50349 is also disclosed a power transmission system in which power of an engine is directly transmitted to front wheels through the conventional differential gear unit, while it is transmitted to rear wheels via differential drive means making use of a viscous fluid coupling mechanism as described above.

As described above, a power transmission system making use of a differential drive unit of viscous fluid coupling type becomes simple in structure and has its weight reduced, but in such a differential drive unit it may possibly happen that the above-described annular plates themselves take a mutually locked condition and hence relative slip therebetween is prevented. If such a condition should arise, transmission of an excessively large torque would become possible because the housing and the axles are directly coupled via the annular plates, and accordingly, mechanical strengths of the respective parts in the drive system must be made so strong as being compatible to such an excessively large torque, so that one cannot expect to achieve desired reduction of the weight of the unit.

SUMMARY OF THE INVENTION

According to the present invention, in a power transmission system for vehicles in which a torque is transmitted directly from a power source to a first axle, while it is transmitted to a second axle by the intermediary of a torque transmission unit making use of viscosity of fluid, between the above-mentioned power source and the aforementioned second axle is provided torque limiter means for limiting a torque transmitted to the second axle to a preset value or less.

According to the present invention, even if the above-described locked condition should arise in the torque transmission unit making use of viscosity of fluid, the torque transmitted from the power source to the second axle would not become larger than a fixed preset value owing to presence of the torque limiter means, so that there is no need to make the respective parts in the driving system have a mechanical strength durable against a torque exceeding this preset value, and accordingly, it is possible to reduce the weight of the driving system. Also, by employing the torque transmission unit making use of viscosity of fluid, the structure of the driving system can be simplified.

DETAILED DESCRIPTION OF THE PREFERRED EMBODIMENTS

In the following, description will be made on the present invention in connection to the illustrated embodiments.

Figure 1:
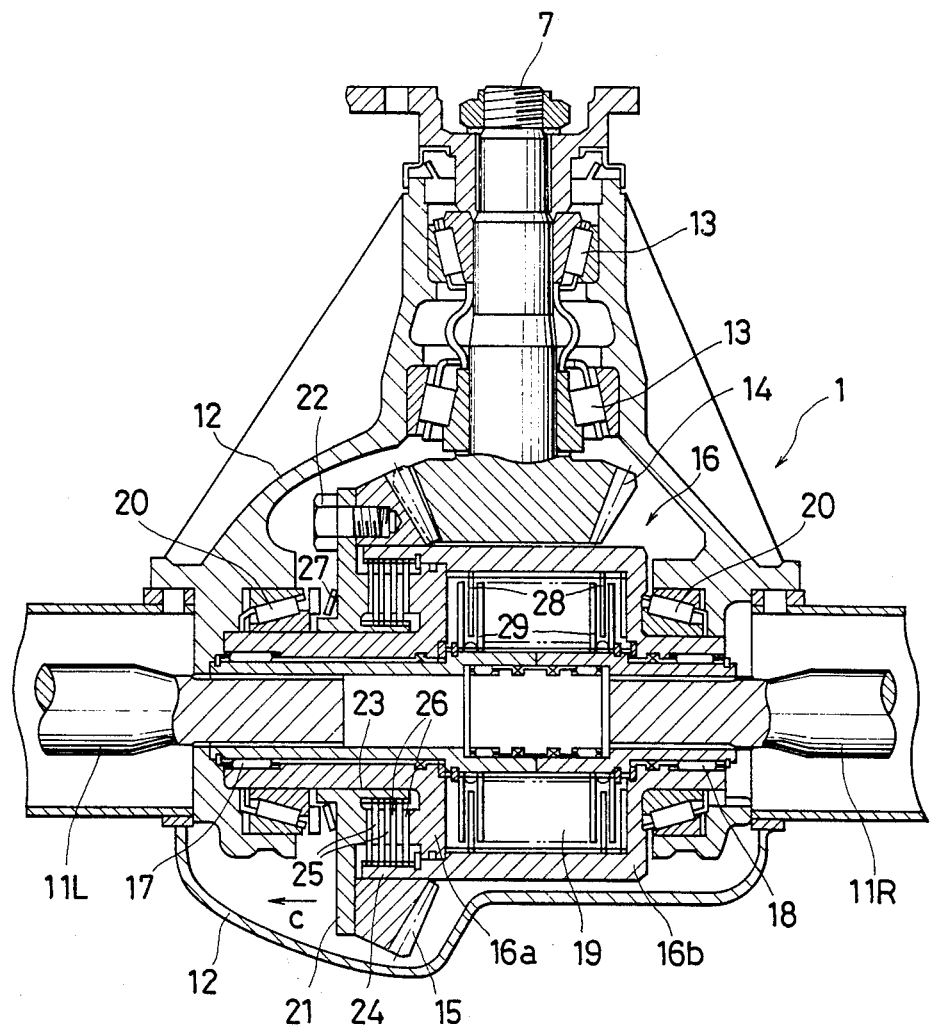
FIG. 1 is a horizontal cross-section view of a viscous fluid coupling device in one preferred embodiment of the present invention.
Figure 2:
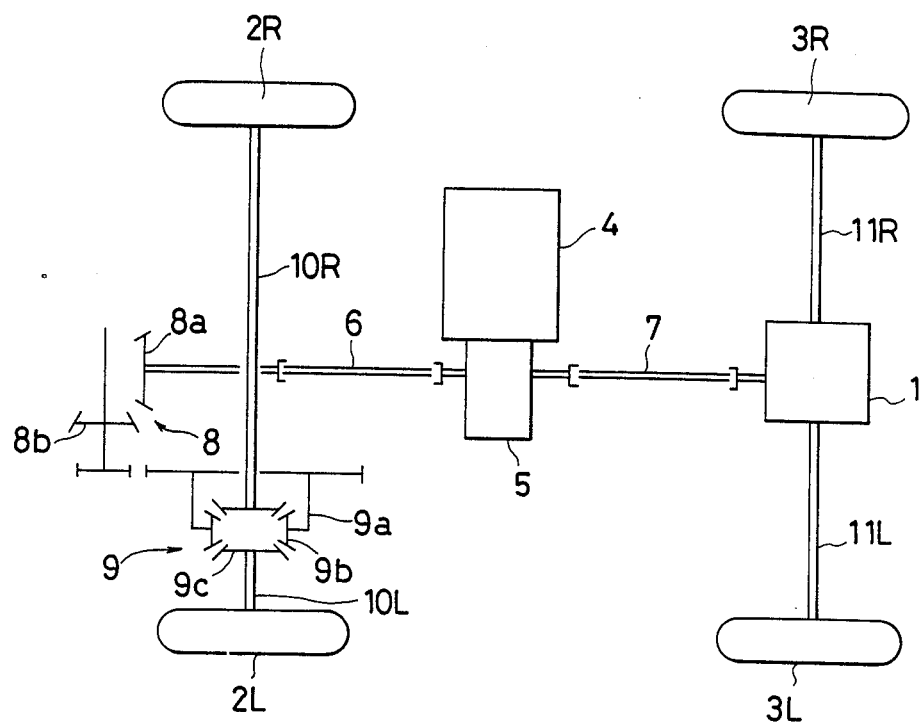
FIG. 2 a schematic view showing a power transmission system of a four-wheel drive motorcar in which the same coupling device is assembled.

FIGS. 1 and 2 illustrate one preferred embodiment of the present invention, FIG. 1 being a cross-section view of torque transmission unit making use of viscosity of fluid, that is, a viscous fluid coupling device 1, and FIG. 2 being a schematic view showing a power transmission system of a four-wheel drive motorcar in which the same viscous fluid coupling device 1 is assembled. In FIG. 2, reference numerals 2L and 2R designate left and right front wheels, respectively, numerals 3L and 3R designate left and right rear wheels, respectively, and numeral 4 designates an engine. A front wheel propeller shaft 6 and a rear wheel propeller shaft 7 extend in the forth and back directions from a speed changer 5 connected to the engine 4, and the front wheel propeller shaft 6 is connected to left and right front axles 10L and 10R (first axle) through a reduction gear unit 8 consisting of a speed reduction smaller gear 8a and a speed reduction larger gear 8b and via a differential gear unit 9 consisting of a differential gear box 9a a differential smaller gear 9b and a differential larger gear 9c. This front wheel drive mechanism is that employed conventionally in motorcars, in which a torque transmitted from the engine 4 can be equally distributed to the left and right front axles 10L and 10R, and upon turning of a vehicle the front axles 10L and 10R can make rotation at different speeds, that is, can achieve differential operation. Power transmission via such gear units is called "direct power transmission" throughout this specification and the appended claims.

The rear wheel propeller shaft 7 is connected to left and right rear axles 11L and 11R (second axle) via a viscous fluid coupling device 1 details of which are shown in FIG. 1. In the following, the viscous fluid coupling device 1 will be explained with reference to FIG. 1. The viscous fluid coupling device 1 is accommodated within a support box 12, into which the above-described rear wheel propeller shaft 7 penetrates from the forth and is rotatably supported via a bearing 13. At the inner end of this rear wheel propeller shaft 7 is integrally formed a pinion gear 14 consisting of a bevel gear, and this pinion gear 14 is meshed with a ring gear 15 also consisting of a bevel gear. In addition, into the support box 12 penetrate the above-mentioned rear axles 11L and 11R from the left and the right, respectively.

Within the support box 12 is disposed a coupling case 16 which extends over the left and right rear axles 11L and 11R so as to surround them and is rotatable relative to the rear axles 11L and 11R. This coupling case 16 is divided into left and right coupling case sections 16a and 16b, the coupling case section 16a is rotatably supported from the left rear axle 11L via a needle bearing 17, and the coupling case section 16b is rotatably supported from the right rear axle 11R via a needle bearing 18. And a sealingly enclosed coupling case chamber 19 which extends over the rear axles 11L and 11R so as to surround their outer peripheral portions, is formed by the coupling case section 16a and the coupling case section 16b. The coupling case 16 is in turn rotatably supported from the support box 12 via roller bearings 20,20.

The above-mentioned ring gear 15 is fixedly secured via bolts 22 to a ring gear carrier 21 which is fitted around an outer circumferential surface of a cylindrical portion along the rear axle 11L of the coupling case section 16a so as to be relatively rotatable and axially slidable. A boss portion 23 of the ring gear carrier 21 extends rightwards along the coupling case section 16a so as to radially oppose to a cylindrical portion 24 of the coupling case section 16b extending leftwards. On the outer circumferential surface of the boss portion 23, are slidably spline-fitted clutch inner plates 25, while on the inner circumferential surface of the cylindrical portion 24, are slidably spline-fitted clutch outer plates 26 which are adapted to be engaged with the clutch inner plates 25. The ring gear carrier 21 is biased rightwards by means of a dish-shaped spring 27, hence normally the clutch inner plates 25 and the clutch outer plates 26 are brought into press contact with each other by the resilient force of this spring 27, and so, the engine torque transmitted to the ring gear carrier 21 via the rear wheel propeller shaft 7, the pinion gear 14 and the ring gear 15, is further transmitted through the clutch inner plates 25 and the clutch outer plates 26 to the coupling case 16.

Within the coupling case chamber 19, there are alternately disposed a large number of annular plates 28 mounted on an inner circumferential surface of the coupling case 16 and a large number of annular plates 29 mounted on outer circumferential surfaces of the left rear axle 11L and the right rear axle 11R as aligned in the axial direction adjacent to each other, and viscous fluid such as silicone or the like is sealingly enclosed in the coupling case chamber 19. Accordingly, the torque transmitted to the coupling case 16 in the above-described manner, is transmitted to the rear axles 11L and 11R via a viscous shearing force (viscous resistance) of the viscous fluid existing between the annular plates 28 and the annular plates 29. If the transmitted torque exceeds a value corresponding to the maximum viscous shearing force, slip would arise between the coupling case 16 and the rear axles 11L and 11R, and therefore a torque exceeding the value would not be transmitted to the rear axles 11L and 11R. Also, in the event that a load upon either one of the rear axles 11L and 11R has been increased, slip would occur between the rear axle 11 on the side of the increased load and the coupling case 16, and thus differential operation would be effected between the left and right rear axles 11L and 11R.

In this way, there is provided a differential unit that is simple in structure and light in weight as compared to the differential gear unit in the prior art by making use of viscosity of fluid, but since the annular plates 28 and the annular plates 29 are disposed close to each other via viscous fluid within the coupling case 16, sometimes it may happen that adjacent annular plates take a locked condition to each other and hence a torque exceeding a value corresponding to the maximum viscous shearing force of the viscous fluid itself can be transmitted via the annular plates 28 and 29. Accordingly, the respective parts in the power transmission system including the viscous fluid coupling device must be those having a sufficient mechanical strength for bearing against even such an excessive torque, and consequently, the above-mentioned effect of reducing a weight would be decreased.

In order to avoid such disadvantages, in the preferred embodiment of the present invention illustrated in FIGS. 1 and 2, a clutch mechanism consisting of clutch inner plates 25 and clutch outer plates 26 is inserted between the coupling case 16 and the ring gear 21, and this clutch mechanism is held engaged by a resilient force of the spring 27. Since the pinion gear 14 and the ring gear 15 are bevel gears, when a torque is transmitted therebetween by the meshing between the respective gears, a thrust as indicated by arrow C in FIG. 1 is exerted upon the ring gear 15. Accordingly, if the torque transmitted between the respective gears 14 and 15 becomes excessively large, then the above-described thrust C overcomes the resilient force of the spring 27, resulting in retreat of the ring gear 21, hence the clutch consisting of the clutch inner plates 25 and the clutch outer plates 26 is released, and so, even if the coupling case 16 and the rear axle 11 should take a directly connected condition, a torque exceeding a value preset by the spring 27 would never be transmitted through the viscous fluid coupling device 1. In other words, since the transmitted torque is limited to smaller than a value preset by the spring 27, there is no need to strengthen the respective parts in the power transmission system so as to bear against an excessively large torque exceeding the above-mentioned preset value, and reduction in weight of the differential unit can be achieved. In addition, the connecting force of the clutch 25, 26 can be adjusted by the resiliency of the spring 27, and so, depending upon a combination of this connecting force and torque transmission capacity of the coupling case 16, a torque limiting device having various characteristics can be realized.

Figure 3:
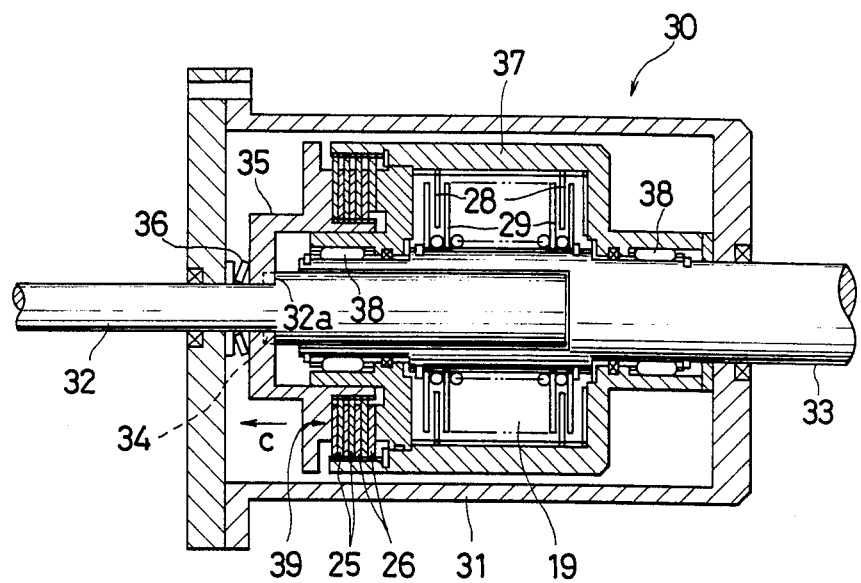
FIG. 3 is a horizontal cross-section view of a viscous fluid coupling device in another preferred embodiment of the present invention.
Figure 4:
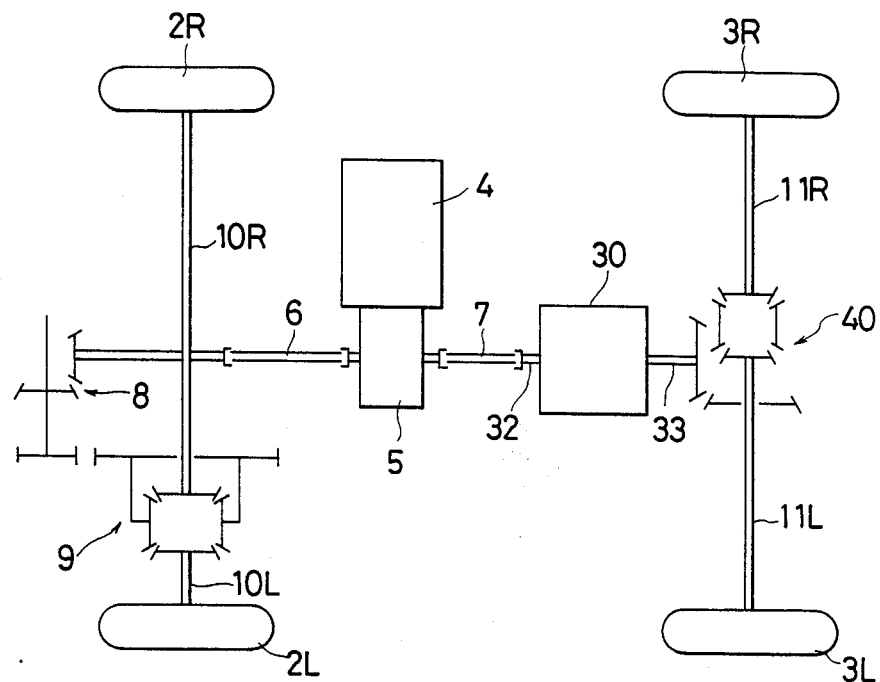
FIG. 4 is a schematic view showing a power transmission system of a four-wheel drive motorcar in which the coupling device in FIG. 3 is assembled.

FIG. 3 shows a viscous fluid coupling device 30 in another preferred embodiment of the present invention, and FIG. 4 shows a power transmission system of a four-wheel drive motorcar in which the same viscous fluid coupling device 30 is assembled. In this viscous fluid coupling device 30, an input shaft 32 and an output shaft 33 extend from the opposite end portions of a support box 31, and this coupling device is adapted to transmit a torque on the input shaft 32 to the output shaft 33. Within the support box 31, a clutch member 35 is coupled to the input shaft 32 via a claw clutch 34. The clutch member 35 is urged against a stepped portion 32a of the input shaft 32 by means of a spring 36, so that the input shaft 32 and the clutch member 35 are coupled to each other by meshing between teeth formed on an end surface of the stepped portion 32a and teeth formed on an end surface portion of the clutch member 35 opposed to the former teeth, and if a torque transmitted therebetween becomes large, the clutch member 35 would move in the direction indicated by arrow C against a resilient force of the spring 36. Around the output shaft 33 is rotatably fitted a coupling case 37 that is similar to the above-described coupling case 16, via needle bearings 38. With respect to the coupling case 37, component parts thereof similar to those in the above-described first preferred embodiment are given like reference numerals and detailed explanation thereof will be omitted. Between the clutch member 35 and the coupling case 37 is provided a multi-plate clutch 39 consisting of clutch inner plates 25 and clutch outer plates 26 similar to those in the above-described first preferred embodiment, this multi-plate clutch 39 is also engaged by the resilient force of the spring 36, so that a torque on the clutch member 35 is transmitted to the coupling case 37. If an excessively large torque is exerted, then the thrust in the direction C generated at the claw clutch 34 would overcome the resilient force of the spring 36, resulting in retreat of the clutch member 35, and thereby the multi-plate clutch 39 is released. Thus, in a similar manner to the above-described first preferred embodiment, a transmitted torque can be limited to smaller than a value preset by the spring 36.

This viscous fluid coupling device is assembled in a power transmission system for rear wheels 3 as shown in FIG. 4. In this connection, component parts similar to those shown in FIG. 2 are given like reference numerals, and further explanation thereof will be omitted.

The input shaft 32 of the viscous fluid coupling device 30 is connected to the rear wheel propeller shaft 7, and the output shaft 33 is connected to the left and right rear axles 11L and 11R via a differential gear unit 40. In this second preferred embodiment also, since a transmitted torque can be limited to smaller than a preset value by means of the spring 36 similarly to the above-described first preferred embodiment, reduction in weight of the respective parts in a power transmission system can be realized.

What is claimed is:

1. A power transmission system for vehicles in which a torque generated from a power source is transmitted directly to a first axle and is also transmitted to a second axle via a torque transmission device making use of viscosity of fluid; characterized in that torque limiter means for limiting a torque transmitted to said second axle to smaller than a preset value is provided between said power source and said second axle, wherein said torque limiter means consists of a clutch member driven by an input shaft of said torque transmission device and slidable in the axial direction, a plurality of clutch plates are provided between a coupling case in said torque transmission device and said clutch member, and a resilient member is provided for pressing said clutch member to make said clutch plates engage with each other.

2. A power transmission system as claimed in claim 1, wherein said clutch member is coupled to said input shaft via bevel gears meshed with each other so that a thrust generated by meshing between said bevel gears is opposed by the pressing force of said resilient member.

3. A power transmission system as claimed in claim 1, wherein said clutch member is coupled to said input shaft via a claw clutch so that a thrust generated by meshing in said claw clutch is opposed by the pressing force of said resilient member.

4. A power transmission system as claimed in claim 1, wherein a differential gear unit is interposed between said torque transmission device and said second axle.

* * * * *